Figure 1:
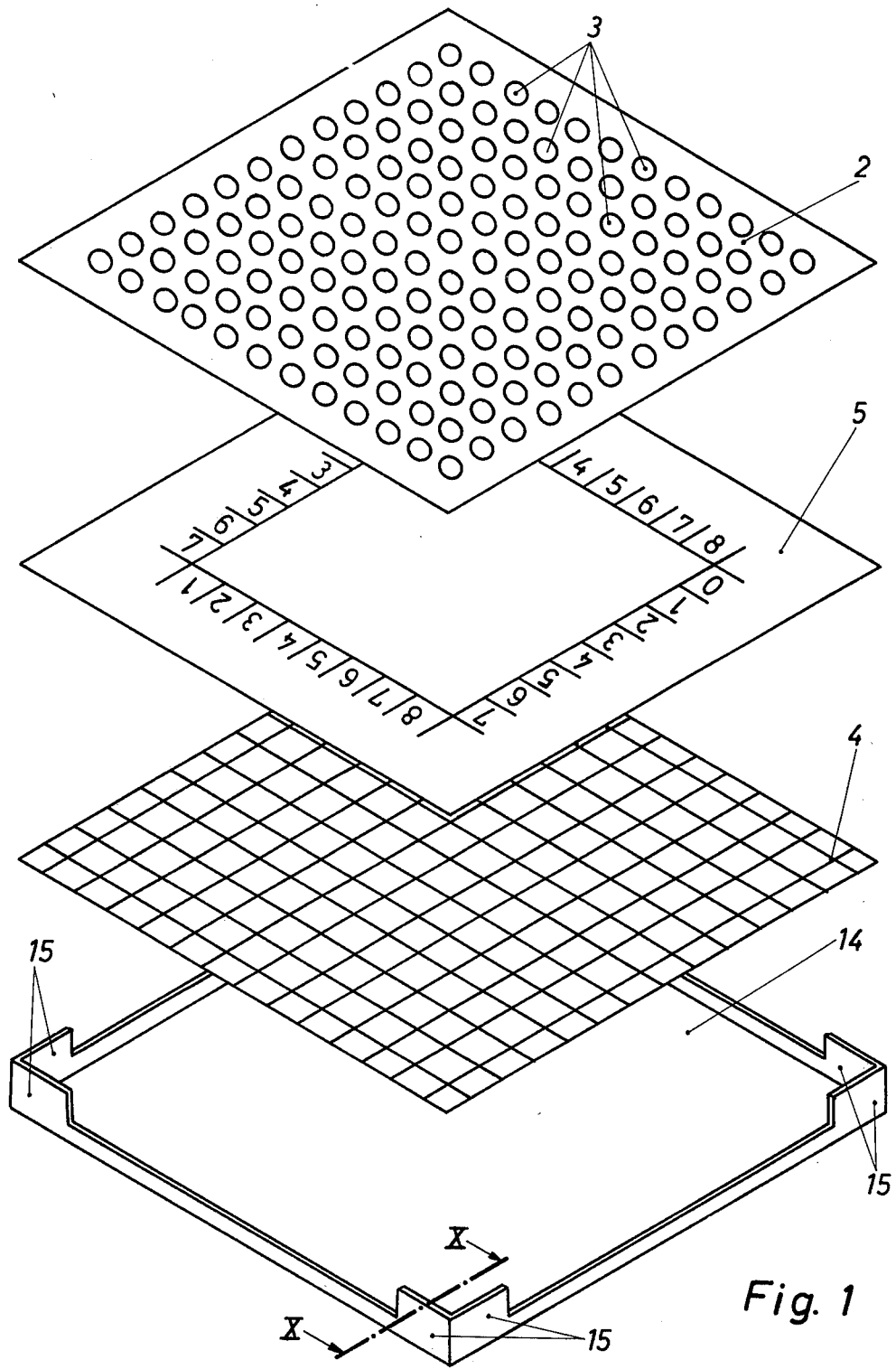
Figure 2:
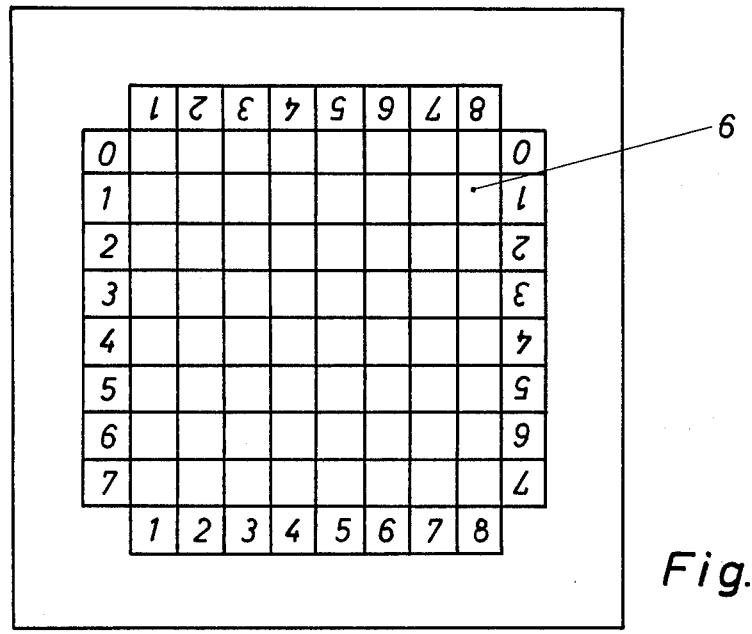
Figure 3:
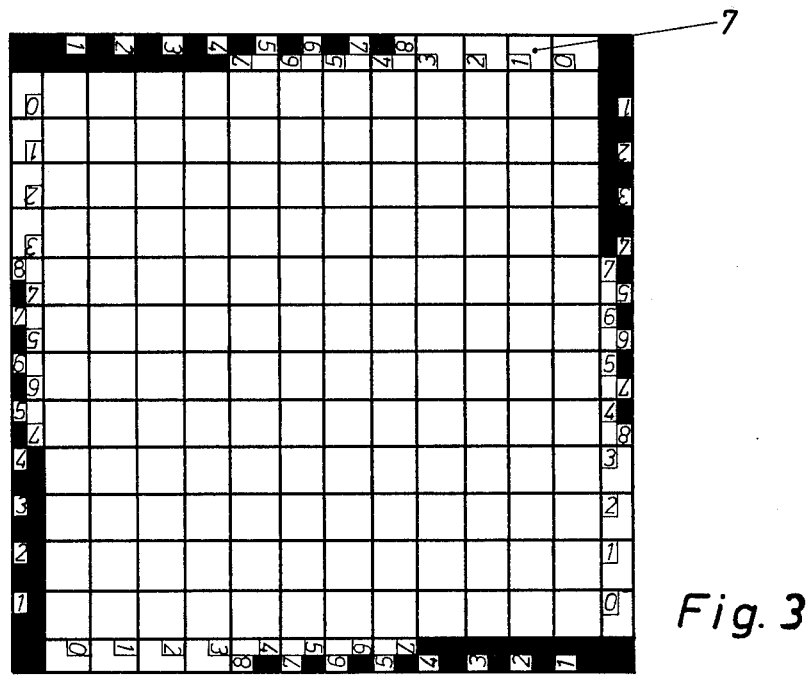

United States Patent [19]

Eigen et al.

[11] 4,043,559

[45] Aug. 23, 1977

[54] EDUCATIONAL GAME

[76] Inventors: Manfred Eigen, Georg-Dehio-Weg 14, 34 Gottingen; Winkler, Ruthild, 3431 Berlepsch, uber Witzenhausen, both of Germany

[21] Appl. No.: 630,793

[22] Filed: Nov. 11, 1975

[51] Int. Cl.² .............................................. A63F 3/00
[52] U.S. Cl. ................................................ 273/130 R
[58] Field of Search .......... 273/130 R, 130 A, 130 D, 273/131 B, 131 AD, 134 GA, 135 AA, 135 AD, 135 AB, 136 B, 136 E, 136 C, 136 K, 142 F, 146, 147

[56] References Cited

U.S. PATENT DOCUMENTS

| 607,552 | 7/1898 | Risbrough | 273/147 |
|---|---|---|---|
| 1,683,860 | 9/1928 | Cahill | 273/131 B |
| 1,824,647 | 9/1931 | Wright | 273/142 F |
| 2,665,913 | 1/1954 | Hlavac | 273/131 AD X |
| 3,113,778 | 12/1963 | Silverman | 273/136 E X |
| 3,208,754 | 9/1965 | Sieve | 273/146 |
| 3,484,108 | 12/1969 | Geiger | 273/135 AB |
| 3,514,110 | 5/1970 | Thomander | 273/130 D |
| 3,779,554 | 12/1973 | Brix | 273/131 B |
| 3,799,547 | 3/1974 | Hills | 273/131 B |

OTHER PUBLICATIONS

Mathematical Games–"Life"; Scientific American, Oct., 1970, pp. 120–123.

*Primary Examiner*—William H. Grieb
*Attorney, Agent, or Firm*—Max Fogiel

[57] ABSTRACT

An educational game arrangement in which a systematic set of games may be played on a plurality of interrelated templates or game boards. The games played on the boards are aimed at teaching statistical principles, for example, as applied to situations in chemistry, biology, physics and economy, for example. The boards are superimposed on each other within a holding arrangement, and may be easily selected for playing a particular game. The boards or templates are held in predetermined registered position with respect to each other in the holding unit, and a transparent covering plate is positioned over the stack of the game boards. The latter is provided with coordinate markings along their rims, and the selected game board is visible through the transparent cover. The cover has openings or recesses which are arranged to correspond to a coordinate grid formed by the coordinate markings on the templates or game boards. Marking elements in the form of balls, for example, are insertable in the recesses or openings in accordance with predetermined rules dependent on numbers resulting from a toss of dice.

14 Claims, 25 Drawing Figures

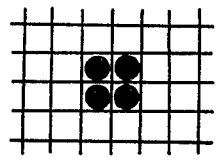
Fig. 14
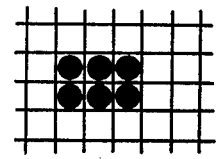
Fig. 15
| | Number of enemy balls to be removed at the end of move ○→● |
|---|---|
| | 1 |
| | 1 |
| | 2 |
| | 4 |
| | 1 |
Fig. 16

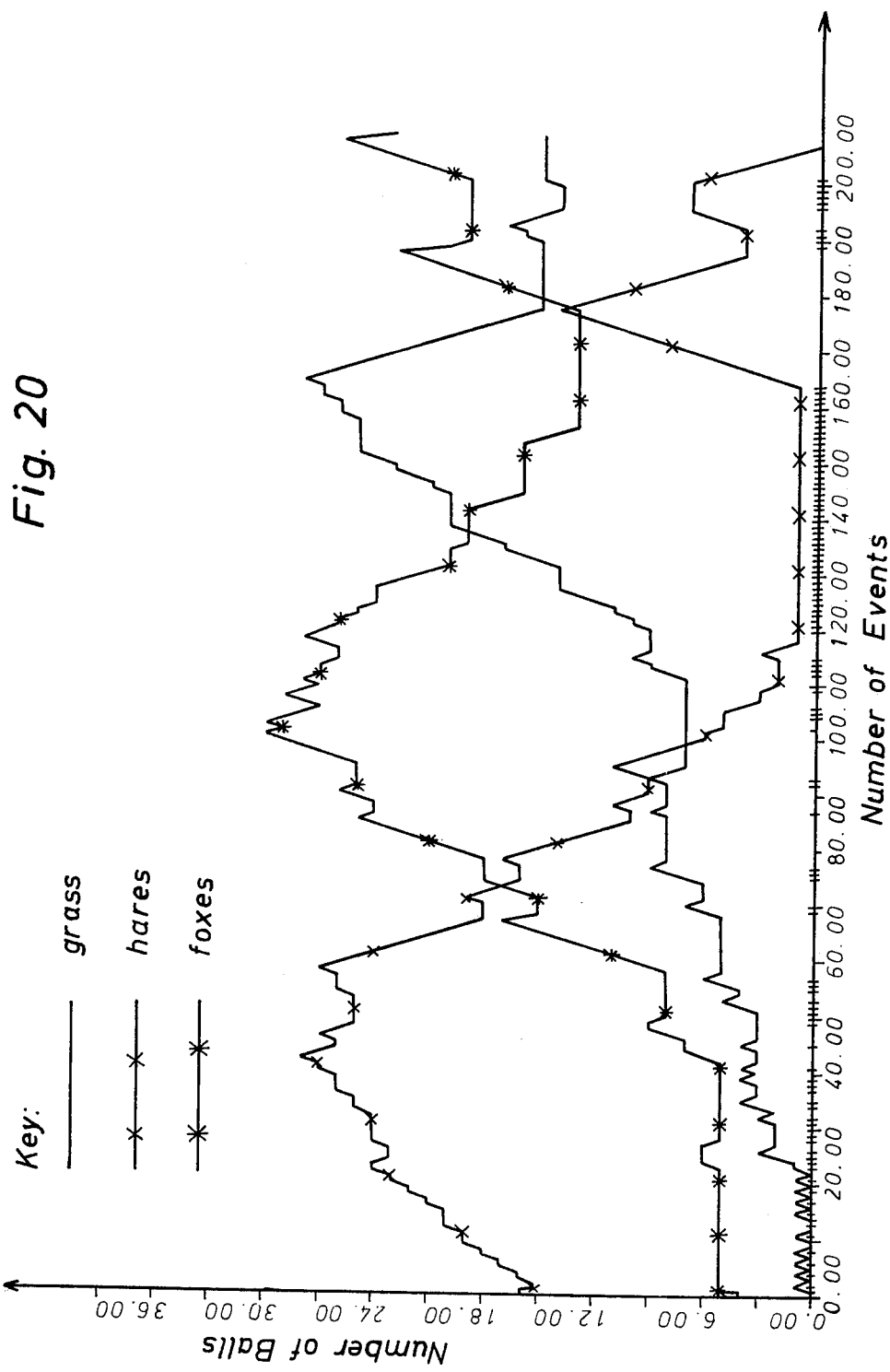

EDUCATIONAL GAME

BACKGROUND

Central to the game lies the task of creating a set of components with which a variety of games for entertainment and/or instruction can be set up, in combination with rules which correspond to processes observable in Nature.

Thus physical, chemical, biological, sociological and other processes can be simulated and made comprehensible in the game. Thus an educational purpose going beyond the mere game can be fulfilled, and this cannot be achieved with traditional games, as their rules have a historical origin and do not possess any simple, directly interpretable scientific content.

In the invention a set of game components is used which consists basically of a base-board, several templates inscribed with co-ordinates, which can be fitted onto the base-board to designate the field of play, several variously-marked sets of pieces (figures) and a random number generator corresponding to the co-ordinates inscribed on the stencil, in addition to rules which define the use of various components in each game.

In addition there should also preferably be a tray to hold the pieces during the game. This is to be fixed over the baseplate and perforated with holes or recesses (or made out of a grating) so as to correspond with the field of play set out on the template. It is of particular advantage if this tray can consist of transparent or translucent material. As an alternative to the tray it is possible to make the baseplate and the pieces from magnetisable material or from permanent magnets. Suitable projections or mountings are used to hold the components in their correct position over the baseboard while they are in use.

A further improvement can be effected if the baseplate or a template bears a grating (preferably of squares), and the set of game components is completed with various-sized covering frames which are inscribed with appropriate co-ordinates.

It is particularly expedient if the baseplate forms the bottom of a flat box whose edges hold the templates and the tray in position.

The squares defined by the lattice net can be individually coded or inscribed. As pieces, glass balls should for preference be used, and as random number generators, various dice or pairs of dice with tetrahedral, octahedral, dodecahedral, icosahedral or similar shapes, whose faces are appropriately marked or coded. They can also consist of a top or roulette wheel, coded or inscribed so as to correspond with the rules of the various games.

The squares on the baseboard, the pieces, the random number generators and the templates can be provided with appropriate inscriptions for the various code systems, which are related to different physical, chemical or mathematical systems.

In some games additional elements are visualized, which can be brought onto the pieces or onto the tray, such as hats, frames and similar ways of distinguishing specific pieces (figures) or regions of the field of play, for example particular relationships between them. In addition, the pieces may be used with coupling elements to keep them together.

The complete game set is according to the above principle divided into various sections. The individual games are not only interesting board games for several players but also demanding instructional games, whose intellectual and aesthetic content can be made to suit any age-group. Comprehension of the didactic content is possible even in the primary-school years. A deeper appreciation comes later, as soon as simple methematical relationships are grasped and their relation to fundamental phenomena in physics, chemistry and biology is recognized. From this stage the game leads on to current research problems. In particular, it gives expression to the probabilistic character of physical laws. Relationships (whose consequences have hardly been sounded out) are touched upon, extending to biology, information science, social science and even art. The important thing is however that no specialized or scientific knowledge is presupposed in the game. The key difference between this and other well-known games (chess, draughts, Halma, Monopoly, Go, etc.) consists above all in the fact that the basic rules correspond to simple mathematical and physical regularities which are applied, at first unconsciously, in the game. Hermann Hesse comes close to the game in this invention when he speaks of the "Glass Bead Game." In accordance with this, the game in the invention is also played with glass beads or balls. But the glass balls only begin to "live" when they begin to interact with each other in a particular game. This idea is embodied in the combination realized in Nature of law and chance.

THE IDEA OF THE GAME AND ITS SCIENTIFIC BASIS.

The principle of this collection of games sets out from the fact that elementary processes of matter are not precisely predictable, owing to the Heisenberg Uncertainty Principle of quantum mechanics. Individual events are only describable in terms of their probability. This limited indeterminacy of elementary processes is simulated in the game by the throwing of dice, the issue of which determines the behaviour of the individual elements of matter represented by the glass balls. Since many such elementary processes work together in each game to determine the game's outcome a valid representation of observable macroscopic events is possible. This event can be some kind of physical process, a chemical transformation, a biological mechanism or a sociological phenomenon. This macroscopic process, resting as it does on a large number of elementary events, may show thoroughly deterministic behaviour. As soon as a probability distribution is known it becomes possible to calculate expectation values for large populations. It is ultimately this principle which lies at the bottom of the calculations made by insurance companies. On the other hand, there are also events in physics, known as "instabilities," or in normal usage as "catastrophes," which may also be predicted in terms of a macroscopic picture of events. Whether such catastrophes can appear in Nature depends on the repercussions upon its own development of an undetermined statistical fluctuation occurring in the realm of elementary processes.

The effects of statistical fluctuations can be characterized in three basic ways, as follows. These can be especially well represented with the help of the games.

a. A fluctuation which deviates from a cross-sectional average behaviour shows the tendency to become smaller. The result for large populations is a stable macroscopic behaviour which may be characterized by means of deterministic expectation values.

b. The fluctuation has no influence upon the future development of the system (= game). The macroscopic behaviour follows no rules. Possible states will appear in an unpredictable order. One can say that the system carries out a "random walk".

c. The fluctuations have the tendency to reinforce each other. Here the microscopic fluctuation becomes the cause of a catastrophe which appears on a macroscopic scale.

Because it is undetermined whether a self-reinforcing elementary process appears during the period of observation, the microscopic indeterminacy of an individual elementary process will in case (C) appear macroscopically.

If a material system is to persist stably in a particular state, the self-regulating behaviour of the fluctuations described under (a) must always be fulfilled. Everything that is known in physics and chemistry as equilibrium shows behaviour of this kind. The behaviour of such a macroscopic system is essentially deterministic, that is, predictable within definable limits. In contrast to this, the evolution of living structures based on selection or the evolution even of these ideas is very strongly influenced by instability; indeed, progress demands just such catastrophes in the realm of elementary processes.

In the first section of the game, the various cases of fluctuation behaviour are contrasted with each other and it is demonstrated that evolution arises from a series of instabilities which in each case take the system over into a new, metastable state with a higher information content. The entertaining game "Survival", for two players, rounds off this section. In many respects this game resembles "Go," whose rules are however (arbitrarily) totally subject to the strategic aspect and do not describe simple a natural process.

In the second section specific interactions between individual glass balls are introduced, which give the elementary, statistical processes a particular preferred direction. The natural processes, represented by abstract rules, can result both from static effects of forces and from dynamic transformations. The patterns which arise describe, then, both "conservative" structures, i.e. structures based on static effects of forces, and also "dissipative" structures. The latter are patterns which can only be sustained by means of a perpetual change. In chemistry and biology many examples are known of such structures resulting from dynamic interactions, e.g. biological clocks, the shapes of organisms (which come about by cell differentiation and morphogenesis) or even the complex excitation pattern in the central nervous system, which appear in outline in the structuring of perception fields in the cerebral cortex. A typical game in this section, "Struggle", which concerns a classic example of reactions in chemistry and ecology, will be explicitly described below.

The third section deals with evolutionary processes, starting from molecular biology and including population genetics, going on to the evolution of ideas. The selection processes treated in the first section of the game put down the foundations for this. The general question runs: According to what criterion does selection take place in Nature? How does that arise which we later — if we recognize it as meaningful — call "Information?" One of the games in this section shows tat stabilizing forces encourage the selection of particular structures. It is thus possible, for example, to simulate by suitable rules of play the molecular interactions between the four basic building blocks of the nucleic acid molecules which carry the hereditary material. The amazing thing is that out of the molecules which compete with each other in the game it is just the same ones that win as those which were selected in Nature, thus, for example, clover-leaf structures for transfer nucleic acids or blossom-shaped structures of particular phage variants. For the molecular biologist it is naturally not in the least "amazing", as exactly the same rules are observed in the game as those learnt from Nature. More complex structural pictures appear in the case of protein molecules. As these consist of 20 basic building blocks a similar complexity may be expected as in language structures, which are put together out of a similar number of basic building blocks, the letters of the alphabet. This relationship is used in several games in which the origin of meaningful words from random distributions of letters is demonstrated. The coding used in the genetic structure and its origin may also be simulated in the game. For this one would use four different kinds (colours) of glass beads and three tetrahedial dice whose four faces would be correspondingly coloured. The alphabet of our genetic information consists, in an abstract sense, of such three-way combinations. Each of these represents a letter of the alphabet in which the functional properties of living systems are written down.

Glass beads can represent in many ways the transformation of codes, codings and information. If with the help of the glass beads musical intervals instead of letters are encoded, and rules of composition are applied in the selection (such as those compiled by J. P. Rameau in classical music), then assonant tone sequences result. Complicated network structures, which have the properties of storing information and of adaptive learning, can also be simulated on the game board.

The fourth and final section is devoted to the sociological aspects of evolution. Exponential growth laws were discussed repeatedly in the preceding section. Population explosion, pollution of the environment, and also a rising standard of living follow such regular laws. In the publications of the Club of Rome the dangers of uncontrolled growth were urgently pointed out. The glass bead game in the invention, given a realistic background, can demonstrate these perspectives with frightening clarity. A further analysis of the growth laws demonstrates the limitations of a simple extrapolation. The recommended "steady state" by the Club of Rome includes the possibility of instabilities, as already explained in the first and second sections. The prevention of catastrophes requires therefore a thought-out regulation; blind curbing of production brings the danger of collapse just as much as does uncontrolled growth.

The general view given here shows that such a many-sided collection of games can always be permuted to give new variants. No limits are set to the imagination.

For just this reason it is also possible to bring most of the traditional board games into the collection, so that templates for Go, chess, draughts, Halma and other games can also be povided. This is also the case for some mathematical games which are less well known. For example "The Life Game," developed by the English mathematician Conway, can be particularly well played on a ball-board with differently coloured glass beads. Variations of this game, which take account of the element of chance ignored by Conway, are described in the book of rules accompanying the game.

The well-known game Nim, a classic example of the game and machine theory developed by J. von Neumann and N, Wiener, can be brought onto the ballboard, with many variations of particular theoretical interest.

GENERAL DESCRIPTION OF THE GAME.

The parts which go together to make up the set of game components described in the invention are shown in the attached drawings as they might be poduced. The invention is not restricted to these exact examples. Their use is explained in the following text, with some instructions and rules. The figures show:

FIG. 1: A perspective drawing of the baseplate with the templates and the tray which are to be laid over it.

FIGS. 2 - 9: Plans of the various templates.

Figure 10:
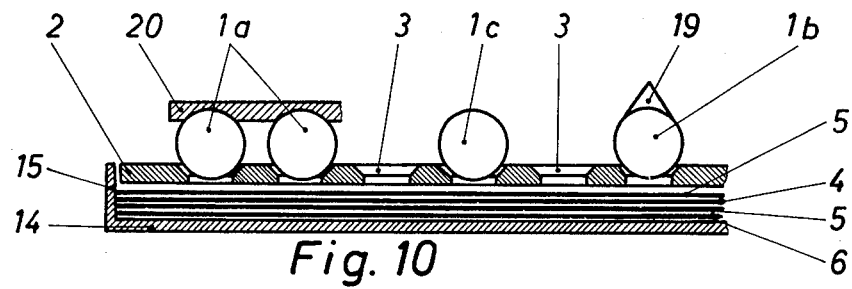

FIG. 10: A cross-section through the baseplate and the tray with the balls in place.

Figure 11:
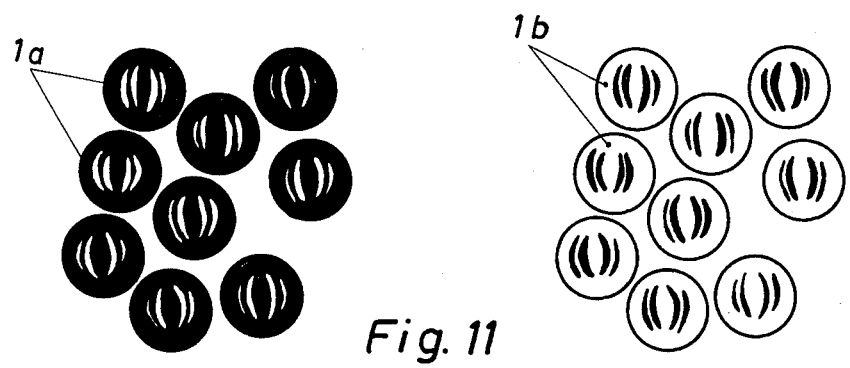

FIG. 11: Various groups of pieces (glass balls).

Figure 12:
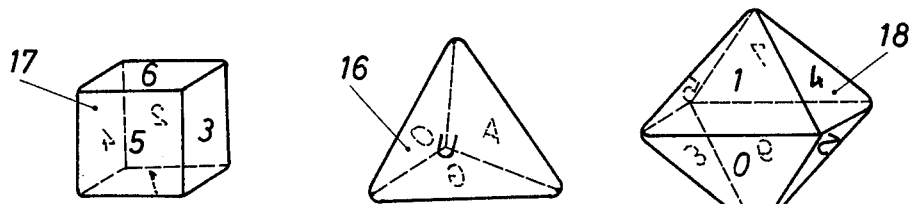

FIG. 12: Various forms of the random number generators.

Figure 13:
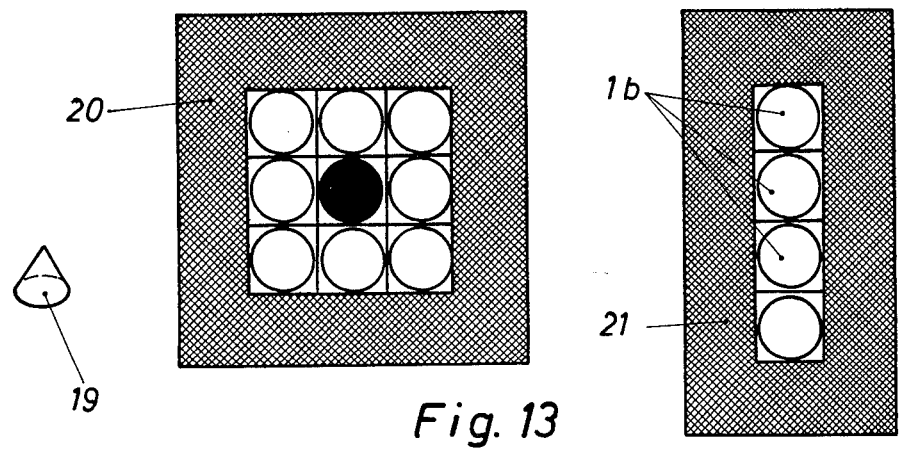
Figure 17A:
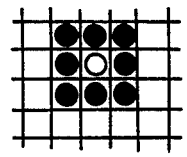
Figure 17B:
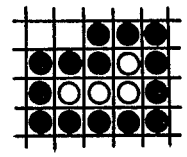
Figure 17C:
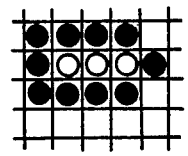
Figure 17D:
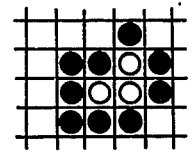

FIG. 13: Various marking components.

FIG. 14 - 19: Schematic representation of various game situations.

FIG. 20: A diagram.

Components of the game common to all sections are:

Several sets of variously marked pieces (figures), as for example groups (20–30 in number) of variously coloured glass balls $1a$, $1b$, etc. as shown in FIG. 11;

A tray 2 with e.g. 12 × 12 to 20 × 20 rows of holes 3 in which balls $1a$, $1b$, $1c$ etc. may be placed;

Various templates 4–13 which alone or sometimes together define the division of the field of play according to the rules (FIGS. 1–9) and which may for this purpose be inscribed with co-ordinates. These templates represent - in conjunction with the introduction to the game - the element of law to which the passage of the game is subject. In order to ensure the correct alignment of templates 4–13 and tray 2, a baseplate 14 with corner or edge fittings 15 is used, which can also be used at the end of the game for putting away and storing the templates and other components of the game. The templates for the various games are stacked on top of baseplate 14 and finally covered over with tray 2.

If the baseplate is constructed as a permanent magnet and the pieces consist of little discs from the material of the baseplate or a corresponding material, the tray 2 can be dispensed with. The templates which consist of a lattice net with co-ordinate notation, can also be replaced by means of a template 4 with a lattice net covering the whole surface and a frame 5 which defines a field of play of only 8 × 8 squares (FIG. 1) or 10 × 10 squares and bears the appropriate coordinate notation.

In addition to the templates, random number generators are necessary. These can be for example sets of dice, or as appropriate pairs of dice in the shapes of the five Platonic bodies: tetrahedon 16, cube 17, octahedron 18, dodecahedron and icosahedron. In this connection it is useful if one dice of the appropriate pair is inscribed in, for example, red and the other in black, and if, correspondingly, one co-ordinate on the appropriate template is inscribed in red and the other in black. In games where a decimal system is required (10 × 10 squares, FIG. 9) one would need an icosahedron with pairs of identically inscribed faces. Here, thus, one dice (red numbers from 0 to 9) would represent the units (0 to 9) and one the tens (0, 10, 20 ... 90). The same applies for the other numerical bases, e.g. 4 for the tetrahedron, 6 for the cube, 8 for the octahedron. 12 for the dodecahedron and 20 for the icosahedron. These dice represent in the game the element of chance. Instead of the pairs of dice, roulette wheels, numbered tops or similar devices may be used.

The single sections of the game are built up according to a logical scheme which is described in the book accompanying the game. This does not only contain the introduction to each game but also explains why the rules were chosen as they were and not otherwise. Thus a particular physical, chemical, biological or sociological phenomenon is described. Since the complete game set is built up like a construction kit, the collection can be extended at will.

In order to mark particular pieces or balls, or to distinguish particular groups of squares or pieces on the board, further pieces are used for designation, as shown in FIG. 13. Individual balls may be made conspicuous by capping them with head-pieces 19. In addition, marking frames 20 and 21 in various forms can be used when it is necessary to emphasize or to demarcate particular groups of balls. The introduction of such pieces will be discussed in detail later.

A GENERAL VIEW OF THE SECTIONS OF THE GAME - ARRANGED ACCORDING TO SCIENTIFIC CONTENT.

I. The statistical laws of physics and chemistry.

1. "Equilibrium". The game demonstrates the occurrence of a stable condition of equilibrium in which statistical fluctuations always tend to reduce themselves. It is based on a model set up by the physicists P. and T. Ehrenfest. Equilibrium is illustrated by means of a distribution of balls on the board, predictable within narrow limits.

2. "Drunken man's walk". A slight alteration of the rules of play removes the self-regulating character of the fluctuations. If a head-or-tails decision is introduced the population of the balls drifts through various occupation configurations of the field of play.

3. "Catastrophe." A further alteration of the rules of play now has the effect that fluctuations build up to an avalanche. The system grows irreversibly and breaks all bounds. A catastrophe sets in.

4. "Selection." A combination of the rules of the three foregoing examples has the effect that in the system particular glass balls are selected and held in a metastable state. A few fluctuations can however lead to collapse of a metalstable state and select a new sort of ball.

This behaviour only appears when the individual sorts of ball do not differ from one another in their physical properties or probabilities of occurrence. Even then a particular colour is chosen set of a particular colour distribution and is then (meta)stably reproduced ("survival of the survivor"). Should the particular sorts of ball differ in their individual properties, then the term "fittest" (in the Darwinian sense) is characterized by a defined, average behaviour.

5. "Survival". The teaching game described above can be combined into a fascinating game which can be played by several people in competition with one another. All the physical regularities described in points 1–4 are reflected. The result of the game is not predictable and depends on the strategic skill of the player.

II. Structure, Pattern, Form.

1. "Co-operativity". The statistical distributions described in part 1 do not lead to any spatial structures or patterns. By introducing interactions between the glass beads the various colours now appear in connected regions. A complete colour change (phase transition) can occur, if the forces of interaction are strong enough. The laws of these co-operative transformations are simulated in the game.

2. "Reaction Structures". Here a large number of chemical reaction mechanisms can be reproduced on the board, where the glass balls represent various chemical compounds. A particularly interesting game for several players is derived from the Lotka-Volterra reaction. It has obvious parallels in ecology and genetics. The most impressive thing about this reaction is that the populations of the reaction partners oscillate or, if a directed movement is imposed, build up a pattern in space.

3. "Cell Differentiation and Morphogenesis." The sort of reaction described in the second game, applied to cells which reproduce themselves, is ultimately responsible for the process of cell differentiation, the building of organs and morphogenesis. The process corresponds to the building of patterns of a periodic reaction in flow gradients. The results of experiments on the build-up of forms in amoeba and hydrazoa can be illustrated on the board.

4. "Excitation Pattern." The storing of opticl stimulation in the form of excitation patterns in the cerebral cortex follows similar laws. This process, presently at the centre of interest in neurobiological research, can be followed with the help of a game.

5. "Symmetry." Appropriate games are introduced to represent the propagation of self-reproducing patterns. Recent work in the field of cellular automata can be explained in this way.

III. Evolution, or the Origin of Information.

1. "Evolution of the Gene." The reproduction of nucleic acids is simulated using realistic experimental information. It emerges that particular structures are of advantage and become winners in the competition. This process is arranged as an interesting game for several players. The structures which arise in this game correspond with those found in Nature and only in recent years analyzed. The game has three variants: (a) simple base-pair structures, (b) symmetry as a consequence of complementarity, (c) recombinative gene exchange (sexual reproduction).

2. "Evolution of Complex Structures and Codes." Protein molecules, from which the vast variety in the living world has arisen, are in their incalculable complexity thoroughly comparable with the structures of our language (combinations of words and sentences). The 30 letters of the alphabet are comparable to the 20 protein building-blocks. In both cases the amazingly large number of variations results from a hierarchical building-up of structure. The starting situation for the evolution of these structures is characterized in a vivid game "Competition for Words." A further evolution game demonstrates, again with the example of language, how sense arises out of nonsense. The parallels with the evolution of functional protein structures are shown up. The rules according to which choice is made are here important. Rules of composition, for example, applied to a random sequence of sounds, change this into a sonorous sequence.

3. "Transfer and Storage of Information; Adaptive Learning." The safeguarding of information against loss by fluctuation can be reached with the help of particular rules. These can be worked into an interesting game in which secret information is exchanged and transmitted. Models for the storage of information in self-organizing networks are also given.

IV. Society and Environment.

1. "The Laws of Growth." The various linear and non-linear laws of growth are produced and applied to models. In a competition game based on Conway's Life Game the mutual impairment of two growing populations is shown up.

2. "Optimisation." Several games which enter into Neumann's game and optimisation theory are also presented.

3. "ROME". The "Club of Rome" game over the limits to growth. The game is based principally on the growth laws treated in (I). Realistic influences are represented in a game for several players. Simple extrapolation is criticised by means of the game situation, in which it is shown that instabilities can make prediction impossible.

EXAMPLES OF INTRODUCTIONS TO GAMES WITH EXPLANATIONS.

Example 1: "Survival"

This is played on a board divided by the inscribed co-ordinates into 8 × 8 squares and — as in the selection game — the dice determine the fate of the balls. Birth, death, competition and the safeguarding of "Lebensraum" are involved in the game, which, while taking place according to the rules in the previous sections, allows the player enough freedom to exploit the random fall of the dice in his own interest. The winner is the player who at the end possesses the greater number of balls in "secure" positions.

At the start, the two players take turns in placing their respective colours on the board so as to occupy as many survival positions as possible. When half the board (32 squares) is covered, the dice is thrown, again in strict turn, according to the following rules:

1. If a player "throws" an unoccupied square, he may place a ball of his colour (from his reservoir) on this square. If there are no more balls in his reservoir he may transfer one of his unfavourably-placed balls onto the square he has thrown. (If all his balls are in favourable positions, he may miss the turn.)

2. If a square is thrown that is already occupied by an opposing ball, this must be put back in the opponent's reservoir. This can however only take place if the opposing ball does not lie in a survival position.

3. If a square is thrown that is already occupied by one of the player's own balls, this ball is "doubled"; to do this the player removes a ball of his own from the reservoir or from an unfavourable square and places it on any empty square. He may then throw again, and so on as long as he continues to throw squares which he already occupies.

The squares have here a strategic significance. At the beginning of the game all the squares have equal value. By their occupation the equality is lifted. This effect simulates specific interactions between material particles.

a. Survival Positions. If four balls are in a region (FIG. 14) which consists of at least four adjacent, quadrilaterally disposed squares, these are "stable" and cannot "die out" unless they are rendered unstable by an opposing encompassing manoevre (vide infra). These "survival regions" can be easily expanded; e.g. by the addition of two more balls a new block is formed (FIG. 15).

Figure 18A:
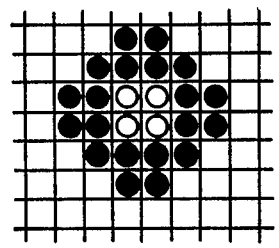
Figure 18B:
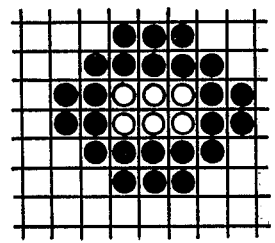
Figure 19A:
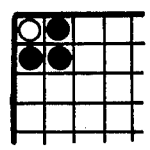
Figure 19B:
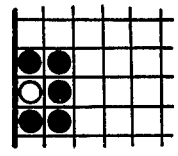

As each new block of four is completed any non-stable opposing ball may be removed to the reservoir. The total number of blocks simultaneously formed in the particular move is here decisive (FIG. 16).

b. Encompassment. If an opposing region is completely encompassed it may be evacuated; the balls are transferred to the reservoir. The encompassing front must be a closed figure of balls with orthogonal edges (FIG. 17a-d). If the closed-in region is a survival position it becomes unstable when encompassed in this way (FIG. 18a, b). Areas at the edges can also be surrounded (FIG. 19a, b).

The game ends when a player has brought all his balls on the board into stable ("survival") positions. Each ball in a survival region counts as one point. The winner is the player with the higher number of points.

Interpretation: The game resembles — purely externally — a number of common board-games, above all the Japanese "Go". This is particularly true in the first phase of the game, in which the balls are placed according to strategic considerations.

This phase, however, serves only to build up a starting position, more or less advantageous of the player. The actual selection game begins with the throwing of the dice, when on the basis of the rules all kinds of statistical fluctuations may appear.

The first rule is that an empty field selected by the dice may be occupied, or an enemy-occupied field evacuated. This rule, taken on its own, would effect a stable average occupation, as illustrated in, e.g., the equilibrium games. If many squares are occupied, many will be evacuated; of few are occupied, there is a high chance of a new occupation. This production (simulated by occupation of empty fields) would be similar to a de novo production. This would hardly occur at high occupation density values. The reproduction law of living structures is, however, of an autocatalytic nature. The production of new structures is a reproduction of ones already present. This means that only where living beings are already present cn further ones arise, and thus the more new beings, the more present in the first place. (Naturally a corresponding large number are dying out at the same time.) The rule according to which a ball can be doubled in a field where it is already present introduces this "autocatalytic" law of reproduction, to which all living beings are subject. If birth and death were exactly proportional to the number of occupied squares, the population density would show uncontrolled fluctuations, as finds clear expression in the "Drunken Man's Walk" game.

For this reason additional, occupation-number-dependent "selective advantages" were introduced: survival regions, extra throws of the dice, "encompassing" etc. These allow a tendency towards deviation from linearity, which expresses itself as a preference for a particular player (the birth-and death-rates are no longer linearly dependent on the population density). Thus the possibility of an instability (or, better, a catastrophe) comes into the game, which ends with the extinction of one sort of ball.

This becomes clear when one considers more closely the laws according to which reproduction and death take place. Raising the number of balls of a particular sort increases the probability of a further doubling.

If the advantage is great enough this means that the player can build up several survival regions, during which his opponent continually forfeits balls. The death rate of the individual balls is no longer proportional to their population, as most of them are protected in survival regions, and these propagate themselves co-operatively. All this taken together leads to the law of catastrophe represented in the third game. All three influences, stabilization, drift or instability take effect in this game as in natural selection. It depends solely on the configuration (which results from chance) which influence prevails. The survival game closes with a distribution similar to "Pat" (stalemate). "Catastrophes" can also occur, where perhaps all the balls of the enemy "die out." The appearance of such catastrophes can be controlled to some extent by the strategy of play, and this makes "Survival" an interesting board game.

2nd Example: "Struggle"
The game sets out from the following situation:
1. Grass grows. Green balls come onto the board.
2. The grass is eaten by hares, so the number of hares increases. Green balls are replaced by yellow ones, however, only when yellow balls are already in the neighbourhood.
3. Foxes eat the hares; the number of foxes increases. Yellow balls can be changed into red ones, but again only when red ones are already in their neighbourhood.
4. Foxes are hunted. Their fur (blue, from the arctic fox) is the trophy. Red balls vanish from the board as soon as their square is thrown. These red balls become the property of the player who has "hunted" them and are collected in the form of blue balls ("points").

To the game belong: a board divided into 8 × 8 squares; two octahedral dice, whose surface markings correspond with the co-ordinates of the squares; 30 green, 30 yellow, 30 red and 30 blue balls.

From the reservoir of green, yellow, red or blue balls 16 yellows and 4 reds are taken to start the game. They are placed on the board by the two players according to strategic considerations, i.e., so that the most rapid changes of colour can take place, by exploitation of next-neighbour relationships. Such relationships are decisive in the game. Here each square is defined as having four neighbours, the four nearest squares. When the starting configuration has been defined by placing the 16 yellow and 4 red balls on the board, the real game begins. The players throw alternately and replace the balls on the board according to the following rules:

| field "thrown" neighbouring fields | empty | green | yellow | red |
|---|---|---|---|---|
| all empty | →green | | | red→blue |
| one or more green | →green | | green→yellow | red→blue |
| one or more yellow | →green | green→yellow | red→blue | |
| one or more red | →green | | yellow→red | red→blue |

Note:
If the neighbouring fields contain more than one colour, the player may decide which of the possible procedures he will adopt.

In general, the opponent may take his turn after the first player has moved according to the scheme shown. However, if further "reaction possibilities" exist then these must be played out before the opponent takes his turn. such a "further reaction" can occur when the first colour-change creates a green-yellow or a yellow-red neighbouring pair. This combination always arises thus:

| From | green - yellow | arises | yellow - yellow |
|------|----------------|--------|-----------------|
| from | yellow - red   | arises | red - red.      |

This transformation rule for further reaction always applies when such combinations of neighbouring balls arise, and it is unimportant which of the two balls was changed in the previous step. The neighbour-relationship in the second, etc., step of the reaction applies always to the most recently changed ball.

For every yellow-red to red-red transition, the player in question has two extra throws. But for these throws only those are valid which "hit" a red ball. Each red ball hit is taken out of the game, is replaced by a blue, and counts as a "point."

The game is over when either all the yellows or all the reds have vanished from the board. The winner is the player with the greatest number of blue balls at the end.

Interpretation: Such an ecological reaction scheme characterizes visually a general mechanism set up and analyzed mathematically by Lotka and Volterra, which in abstract notation runs:

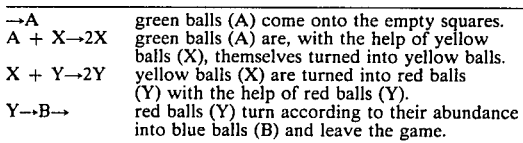

| →A | green balls (A) come onto the empty squares. |
|----|-----------------------------------------------|
| A + X→2X | green balls (A) are, with the help of yellow balls (X), themselves turned into yellow balls. |
| X + Y→2Y | yellow balls (X) are turned into red balls (Y) with the help of red balls (Y). |
| Y→B→ | red balls (Y) turn according to their abundance into blue balls (B) and leave the game. |

The reaction starts with reactant A being turned by collision with reaction partner X into another X. If the catalytically active partner X (the hare) comes upon a local build-up of substrate A (green fodder), this store will indeed be partly emptied, although the rate will at first increase in consequence of the autocatalytic self-replication of X and only decreases, after a delay, when supply A begins to run out. At the same time the local occupation density of X has grown far above its average value and only decreases when supply A is exhausted. If there is another autocatalytic reactant Y (the fox) present, which turns X into Y, then this reservoir X is quickly emptied in favour of reservoir Y; here too the turnover rate of Y goes through a maximum. X soon sinks far below the averge occupation density and A can grow up again, and then the process starts again. The total process resembles a perpetual spilling-over from one reservoir into another. FIG. 20, which records a computer-simulated game, expresses this effect clearly.

3rd Example: "Sense or Nonsense"

Introduction: "Sense or Nonsense" is a game of combination, centred around words and sentences, and can be played by one or by several players. The aim is to assembly meaningful combinations of words and sentences. The players have to compete for individual letter-squares. Players can "throw each other out", or, after attaining a meaningful sequence of letters, "block" certain squares. The winner is the first player to assemble a meaningful piece of information, which is then evaluated on a "points" scale. The game simulates the origin of complicated structures out of different sub-units by means of random distribution. It is explained how functionally effective structures in Nature (in complexity comparable to the words and sentences of our language) arise out of random distributions when they are evaluated and selected for development according to "meaningful" rules. The same development towards "perfection" is demonstrated in a series of further evolution games in which particular sequences of sentences or notes arise through the application of certain rules of selection.

Figure 4:
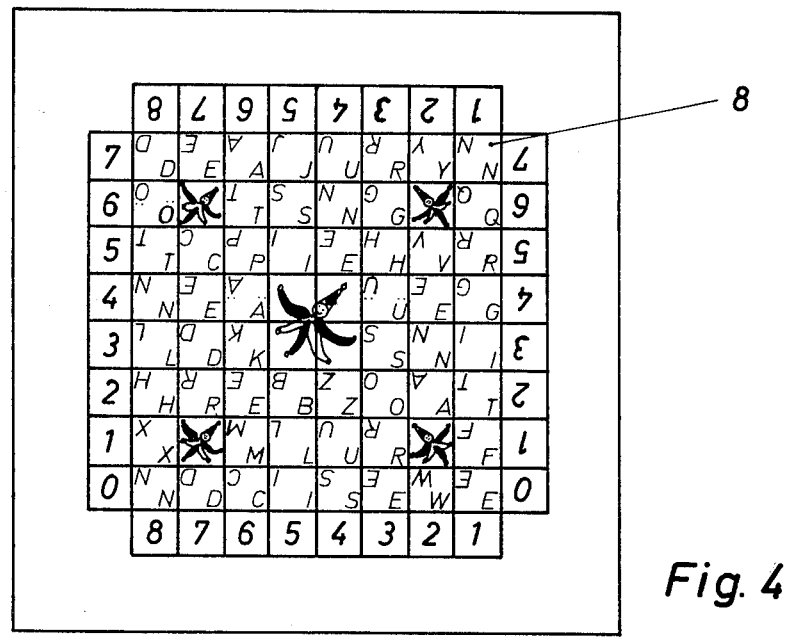
Figure 7:
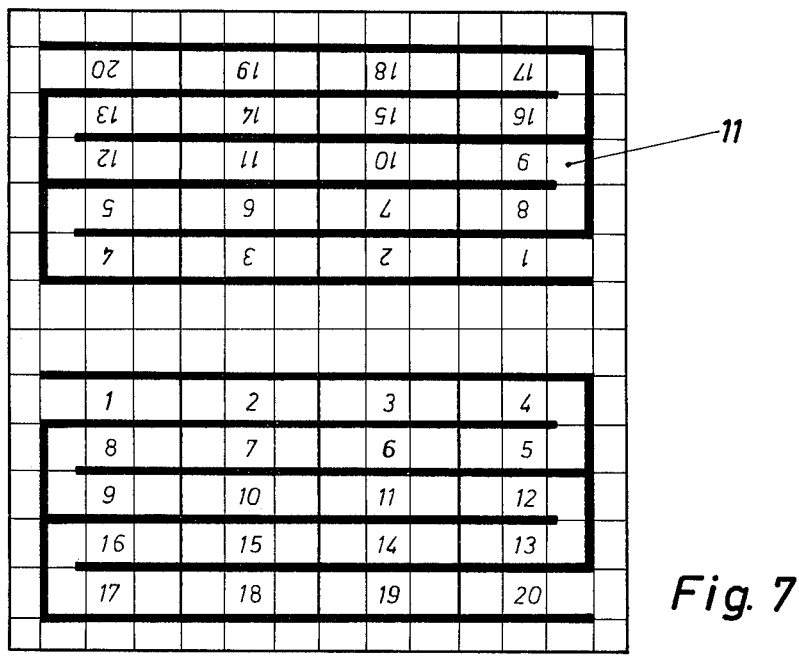
Figure 5:
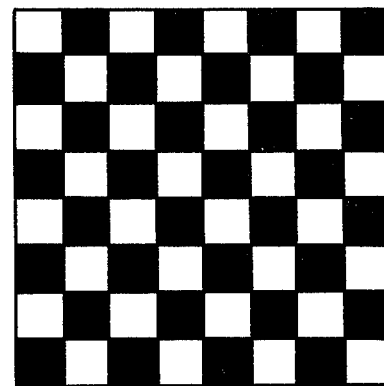
Figure 6:
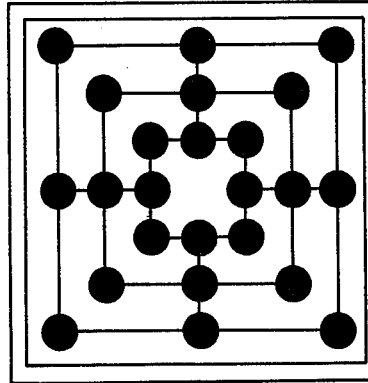
Figure 8:
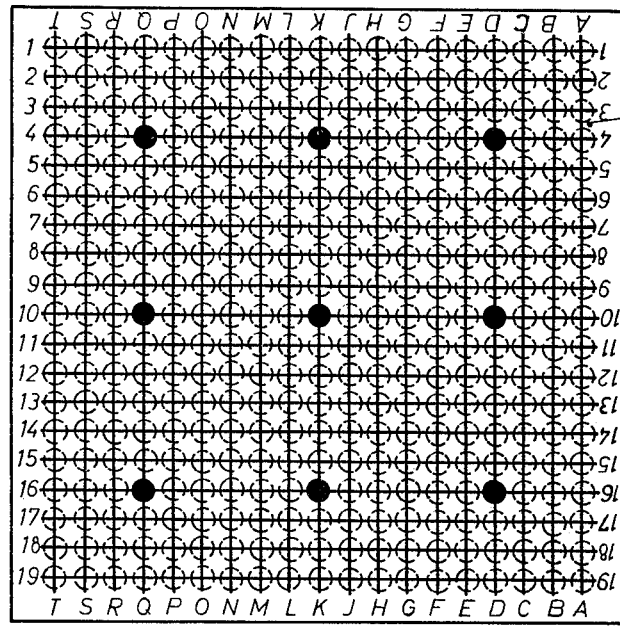
Figure 9:
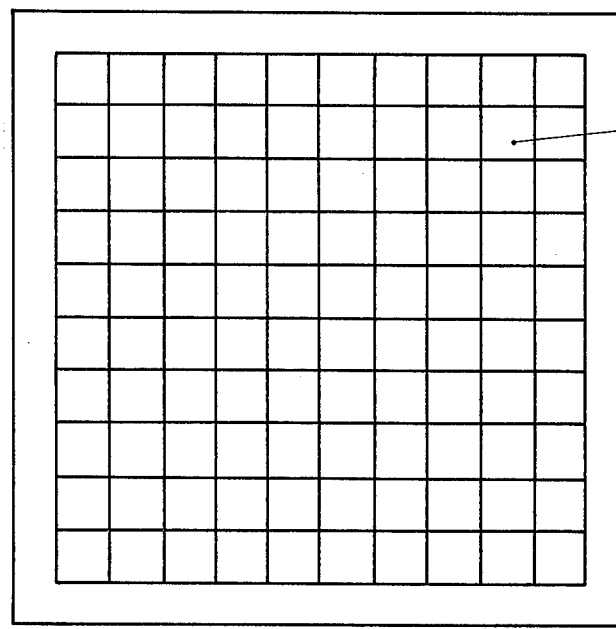

Preparation: The template is used (FIG. 4). It contains a distribution of letters and spaces (for dividing off words) on a 8 × 8 board with appropriate coordinate inscription. A pair of octahedral dice is also used. The distribution of the single letters on the template corresponds to the frequency of their appearance in the English language. Each player receives two sets of approximately 30 balls (if two are playing). Each set of balls has a characteristic colour. (The game can also be played by three players. Then each player receives only approximately 20 balls. For more than three players a larger board is needed.)

Progress of the Game: The players throw the dice, strictly in turn. Each player places a ball from one of his two sets onto the square "thrown". If he lands on a square already occupied by the opponent, he removes the opposing ball from the board and places his own colour on the square, unless the opposing ball can no longer be exchanged. If he lands on a square which he already occupies, then a ball may be placed on any free square, without affecting the ball already on the square "thrown". As soon as a player can combine the letters on the square he occupies into a word he can "block" the squares involved by replacing the balls thereon by balls of his second colour. They can no longer by "thrown out." Blocking is only permissable when the letters on the squares blocked build up a meaningful word, e.g. "house."

Further words can then be "joined on". These may only be joined on, however, if they yield a meaning in conjunction with words already present (e.g. "my house" or "my house has a door", but not "you house" or "house has", although "house has door" is permissable). The single words must be correctly divided off with spaces, for which purpose the fields without letters are used, carrying out the function of a Joker. In the formation of words and sentences the assistance of pencil and paper may be invoked.

Close and evaluation of the Game: The game is over when a player has used up all his balls and at the same time can show a meaningful combination of words. He is the winner. If all the players have placed their balls but no meaningful combination of letters has been made, the winner is the player who can prroduce a combination of letters with meaningful content by altering the smallest number of letters. The letters and spaces count as points, which are counted on the basis of a given system of evaluation.

Interpretation: This game does not appear at first to have a scientific background. One might expect it to appeal more to he language teacher than to the teacher of physics or chemistry. But let us imagine that we had building-blocks before us, and suppose that sensible combination of letters signifies that we had fitted these building-blocks together to make a macromolecule and then folded this so as to make a small molecular machine that catalyses particular chemical reactions. Thus we can understand that even in Nature sense can arise out of nonsense - presupposing that there is such a thing as a "sense"-ible evaluation. We have already met such an example in the Selection game in the first section. "Sensible" means here "advantageous" in the sense of the selection theory, and "advantageous" is anything which assists one's own reproduction.

One might object that in the game described it was possible to put words together from the letters without the order of the letters being predetermined, while in Nature the protein molecules are folded out of chains whose sequence is already laid down.

For this reason another version is visualized which adheres more closely to Nature in this "elementary step". The board (FIG. 2) is taken, on which the red, green, blue and yellow glass balls are placed sequentially in combination of three. The letters of the alphabet are now coded in the 64 combinations. A code table is provided, which takes account of the letters' frequency of occurrence in the language by means of redundant codes. The starting configuration, which consists of a randomly thrown sequence of red, green, blue and yellow glass balls, is changed by random mutation into a sensible sentence. This game simulates very realistically the problem of the genetic code. It can be varied in several ways so that finally coded information can be exchanged between players or laid down in a self-organizing information store.

8. The Outfit and Technical Arrangement of the Game.

The complete collection for the game consists of a basic set which is used in each of the games and of units which are only brought in for particular games. The games are built up on the principle of the construction set so that the system can most easily meet the requirements of flexibility. Thus the collection can be gradually completed and ultimately, by means of new combinations of games, extended.

An important aspect is the aesthetic arrangement, the design of the games. On the basis of the parallel to the glass bead game, glass balls are to be used as pieces (figures). In order to bring the play of colours and reflections properly into effect, which is indeed the aesthetic attraction of glass balls, the board (i.e., the tray) must be made out of clear, transparent plastic. This is also necessary because the templates, which are to be lain under the tray and which have the division of the field of play printed on them, must also be clearly visible. The templates should be rich in contrast, but should on no account detract from the brilliance of the glass balls. The set of game elements described herein is augmented by a set of instructions for a choice of games which can be played with the basic equipment, for example, in the form of filing cards, which can be bound into a loose-leaf book.

Basic equipment can be extended by means of the following supplements:

1. A book of the game in which the scientific basis of the individual games is described in a generally comprehensible way. The filing cards, with the introduction to the various games, can be bound into this book.

2. About 15 additional, specially printed templates to accompany the corresponding introductions to games.

3. Individual sets of glass balls of particular transparent as well as opaque colours. (As well as the four colours given, red, green, blue and yellow, black and white and perhaps other colours will be necessary.)

4. Various kinds of dice (tetrahedron, cube, octahedron dodecahedron, icosahedron) with inscribed faces for various code systems, for example, for the triplet combination of the genetic code three tetrahedrons whose four surfaces carry the letters A (red), U (green), G (blue) and C (yellow). The dice must be distinguishable, for example, black, grey and white, in order to give exactly the code position.

5. Special pieces such as glass balls pierced with a hole so that they can be arranged in order, caps to set on the pieces, frames and so on, for specifically distinguishing glass balls, regions of the field of play, etc.

9. What is new about the collection of games?

The collection of games described here is so conceived that the rules contained therein correspond to simple, naturally observable processes. It follows that the same idea can be used for the representation of very many different scientific facts and thus to erect an entire system of teaching. Alternatively these rules, assigned to simple physical phenomena, can just as well be used in interesting games for several players as any other more or less arbitrarily chosen rules. It is thus possible to approach the game without any previous scientific knowledge, and, after one has the experience of playing, to attempt to recognize the scientific content which lies at the bottom of the game and to assimilate it. "Understand" means here for the most part "to get used to", which is not possible with the usual abstract teaching material. The combined purpose of teaching and entertainment demands a technically unified concept through which the logical structure of the game is made clear. This cannot be attained in a collection which consists of various games having no relation to one another, for their components are constructed according to different principles. Individual units which obey particular regular laws, be they atoms, molecules, polymers, cells, living beings, men or societies, must be characterized by simple, uniform systems, very reasonably by means of coloured glass balls. With the help of the perforated plate these can be arranged into all kinds of possible patterns and structures. Only the template needs to be changed for each game, because it contains the layout of the field of play, designed according to logical principles for the phenomenon to be represented in each game. The unity of Nature, indeed, the unity of nature and spirit, which lies at the bottom of Hesse's "Glass Bead Game," the "Game of Games," is expressed strikingly in this unified concept. The technical details suggested here offer, in contrast with traditional board games, decisive advantages. A game situation cannot be easily disrupted, as the glass balls are fixed in the holes. This will save a great deal of trouble, especially if children are playing. The pair suggested matching-up of co-ordinates and dice offers considerable advantages for the representation of uniform prior probabilities for various number systems. Thus for numbers greater than 6 (up to 400, or more if more than two dice are used) the inefficient lottery discs and drawing of lots may be dispensed with. The template principle is also economical, in particular in the more extensive game sets. Every new game in the collection is realized by the provision of additional templates; this applies too for all traditional games, which can easily be fitted into the collection. Lastly, new kinds of game are presented in the collection, which were not known in the form presented above and which pursue a different end from that of previously-known games. Quite new is the variable coupling of law and chance, and the representation thus produced of the reality of natural laws. Finally, the very stringent requirements of the representational capacity of the game are augmented by means of the production of the game elements in the artistic or aesthetic dimension. It is thus, if we may once more quote Hesse, a game with various contents and values of our culture. One plays with it "as in the golden age of art the painter might have painted with the colours of his palate."

What we claim is:

1. A game for education and entertainment comprising, in combination, a base plate having retaining means along the rim of said base plate; a plurality of templates on said base plate in superimposed position and retained on said base plate in predetermined position by said retaining means, said templates having coordinate markings along the rims thereof, said templates having different game markings, said templates being selectable for different games; a transparent covering plate over said templates and said base plate and held in predetermined position by said retaining means, a selected template being on top of the remaining templates and being visible through said transparent cover plate, said cover plate having impression extending through at least part of the thickness of said cover plate, said impressions being arranged to correspond to a coordinate grid formed by said coordinate markings on said templates; movable position indicating elements insertable into said impressions and having different markings; random generator means for generating random numbers corresponding to the coordinate markings on said templates, said movable position indicating elements being insertable into predetermined impressions on said cover plate dependent on the number generated by said random number generator means.

2. A game as defined in claim 1 including means for orienting in predetermined relative positions said templates, said covering plate and said base plate.

3. A game as defined in claim 1 wherein said position indicating elements are glas balls of different colors.

4. A game as defined in claim 1 wherein said random generator means comprises pairs of dice having at least four surfaces having indicia markings.

5. A game as defined in claim 1 wherein said random generator means comprises rotational means with coded markings corresponding to said coordinate markings on said templates.

6. A game as defined in claim 1 including coding means mounted on said movable position indicating elements.

7. A game as defined in claim 1 including coupling means for interconnecting predetermined ones of said movable position indicating elements.

8. A game as defined in claim 1 wherein said base plate comprises the bottom of a substantially shallow box having side walls, said retaining means being on said side walls for retaining in predetermined oriented positions said templates and sid cover plate.

9. A game as defined in claim 1 wherein said base plate and said movable position indicating elements are comprised of magnetic material.

10. A game as defined in claim 1 including means for holding in predetermined oriented position said base plate, said templates and said cover plate, said movable indicating elements comprising glass balls of different colors; said random number generating means comprising pairs of dice having at least four surfaces with indicia markings thereon; said random generator means having rotational means with coded markings corresponding to the coordinate markings on said templates.

11. A game as defined in claim 10 wherein said movable position indicating elements have hat-shaped coding means mounted thereon.

12. A game as defined in claim 10 including coupling means for interconnecting a plurality of predetermined movable position indicating elements.

13. A game as defined in claim 10 wherein said base plate and said movable position indicating elements are comprised of magnetic material.

14. The game as defined in claim 1 including means for holding in predetermined oriented position said base plate, templates and cover plate; said movable position indicating elements comprising glass balls of different colors; said random number generating means comprising pairs of dice having at least four surfaces carrying indicia markings; said movable position indicating elements having coded mountable on the upper surfaces of said indicating elements; coupling means for interconnecting predetermined movable position indicating elements; said base plate having side walls substantially normal to the plane of said base plate, said side walls having corner portions and a central portion between said corner portions, said corner portions having a depth substantially greater than the depth of said central portion for aligning and holding in predetermined oriented positions said templates, said base plate and said cover plate, said central portion forming a substantially wide U-shaped opening through which edges of said templates are visible and through which open said templates may be grasped and selected for playing; said coordinate grid on said templates comprising at least an eight-by-eight grid; said templates having games interrelated by statistical principles applied to a predetermined field of science.

* * * * *